(12) United States Patent
De Volder et al.

(10) Patent No.: US 6,334,361 B1
(45) Date of Patent: Jan. 1, 2002

(54) PLASTIC RESISTOR AND PROCESS FOR PRODUCING IT

(75) Inventors: Edmond De Volder, Slint-Niklaas; Andre Goossens, Rumst; Marc Panis, Bonheiden, all of (BE); Peter Volz, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/155,456

(22) PCT Filed: Mar. 21, 1997

(86) PCT No.: PCT/EP97/01456

§ 371 Date: Feb. 24, 1999

§ 102(e) Date: Feb. 24, 1999

(87) PCT Pub. No.: WO97/36729

PCT Pub. Date: Oct. 9, 1997

(30) Foreign Application Priority Data

Mar. 29, 1996 (DE) .......................................... 196 12 765

(51) Int. Cl.⁷ ........................... G01D 11/24; G01P 1/02; B29C 33/12; B29C 45/14
(52) U.S. Cl. ........................ 73/431; 29/595; 264/328.1; 264/272.15
(58) Field of Search ............................... 73/431, 866.1, 73/488; 29/595; 264/328.1, 272.11, 272.14, 272.15, 272.16

(56) References Cited

U.S. PATENT DOCUMENTS 4,596,973 A * 6/1986 Form et al. ............. 324/174 X
5,184,064 A * 2/1993 Vicknair et al. .......... 73/431 X (List continued on next page.)

FOREIGN PATENT DOCUMENTS

| DE | 2410630 | 9/1975 |
| DE | 3346159 | 7/1985 |
| DE | 3400870 | 7/1985 |
| DE | 3930702 | 3/1991 |
| DE | 4113587 | 10/1991 |
| DE | 4323084 | 1/1995 |
| DE | 4324557 | 2/1995 |
| DE | 4422739 A1 * | 1/1996 |
| DE | 4444714 | 6/1996 |
| DE | 19504608 A1 * | 8/1996 |
| EP | 357777 | 3/1990 |
| EP | 394824 | 10/1990 |

(List continued on next page.)

OTHER PUBLICATIONS

Abstracts of French patent 2682316 A1 by EPAB entitled "Device, such as a pressure temperature or speed sensor, including a captive nut and by Derwent entitled" Prodn. of device incorporating, captive nuts—such as temperature, pressure and speed sensors, by an injection molding process, inventor Bernard et al. classified in 164/98, Apr. 1993.*

*Primary Examiner*—Thomas P. Noland
(74) *Attorney, Agent, or Firm*—Rader, Fishman & Grauer PLLC (57) ABSTRACT

The present invention discloses a sensor and a method of its manufacture. The sensor is used to sense position shifts, motional velocities or rotational speeds of an encoder and comprises a housing which accommodates electric components. The housing is made up of a first housing part of plastics which is at least in part enwrapped by a second injection-molded housing part that is also made of plastics. The first housing part is designed integrally with at least one positioning element molecularly interfaced with the second housing part.

31 Claims, 4 Drawing Sheets

U.S. PATENT DOCUMENTS

| | | | |
|---|---|---|---|
| 5,239,869 A | * 8/1993 | Uemura et al. | 73/514.34 |
| 5,254,807 A | 10/1993 | Pfander et al. | |
| 5,742,159 A | * 4/1998 | Babin et al. | 324/174 X |
| 5,789,920 A | * 8/1998 | Gass | 324/207.15 X |
| 6,056,909 A | * 5/2000 | Wehling et al. | 264/272.15 |
| 6,072,312 A | * 6/2000 | Van Der Berg | 324/207.16 |

FOREIGN PATENT DOCUMENTS

| | | | | |
|---|---|---|---|---|
| EP | 615130 A2 | * | 9/1994 | |
| EP | 642026 | | 3/1995 | |
| FR | 2576245 | * | 7/1986 | 264/272.15 |
| GB | 2007581 | | 5/1979 | |
| JP | 4-252739 | * | 9/1992 | 264/272.11 |
| WO | 91/04494 | | 4/1991 | |
| WO | 94/06022 | | 3/1994 | |
| WO | 96/00645 | * | 1/1996 | |

* cited by examiner

PLASTIC RESISTOR AND PROCESS FOR PRODUCING IT

TECHNICAL FIELD

This invention relates to sensors and more particularly relates to active or passive sensors for sensing position shifts, motional velocities and rotational speeds of an encoder.

BACKGROUND OF THE INVENTION

In the automotive industry, systems which employ wheel speed sensors for controlling brakes by means of an anti-lock system, are generally known. The devices typically include an encoder which is mechanically connected to a rotating wheel and a sensor sensing the encoder in a non-contact manner.

German published patent application No. 34 00 870 discloses a plastic sensor wherein a first housing part is a coil carrier intended for accommodating a pole core, a coil and two connecting bars. After the first housing part has been fitted with the heated electric components, it is partly spray-coated with plastics in an injection-molding operation to produce a second housing part in which is also embedded the end of a line The sensor which is generally formed of the two housing parts in addition has an opening that is closed by inserting a cover after the line has been connected to the connecting bars. A sensor of this type is exposed to great stress, especially due to moisture, dirt, heat and vibrations. The form lock with the second housing part achieved by injection-molding the first housing part and the insertion of the cover, do not reliably protect the sensor against the ingress of moisture which may cause disturbances or malfunctions of the sensor. Therefore, both housing parts, and the cover with the second housing part, are molecularly interfaced in their contact zone by ultrasonic welding. This measure increases costs incurred for the sensor because it necessitates additional process steps and a considerable expenditure in apparatus.

For this reason, a sensor as disclosed in German published patent application No. 39 30 702 was developed, wherein the seal-tightness of the housing is already provided when the second housing part is produced. When the first housing part is injection-molded by fusible plastics, a separate melting element experiences heating beyond its melting point which causes a molecular bond of both housing parts. However, the melting element which is designed as a foil, filament, or ribbon is not a component of the housing and, therefore, necessitates an additional assembly step in the manufacture of the sensor.

Further, the first housing part is interrupted at its bottom end by a pole pin which, among others, is used to fix the first housing part in position in the mold when the second housing part is injection-molded. This prevents the pole pin from being enwrapped entirely by the injection-molding plastics, with the result that leakage slots will possibly occur and allow the ingress of moisture between the pole pin and the first housing part. Further, no additional possibility of positioning the first housing part in the mold is provided in the above-mentioned prior art apart from the fixed positioning of the first housing part by the pole pin or shoe. Therefore, the first housing part and the electric components connected thereto may be displaced in the mold due to the high melting pressures occurring in the injection-molding process when the second housing part is molded.

European patent application No. 0 357 77 discloses a method and a device wherein a heat-resistant component is positioned in a mold by way of projections and spacers. These positioning elements are an integral part of the component to be spray-coated and, thus, also heat-resistant. For this reason, there is no sealing connection and, more particularly, no molecular bond between the component and the spray-coating material. This produces leakage paths which allow the entry of moisture and contaminants into the component.

An object of the present invention is to provide an active or passive plastic sensor which permits in its making an accurate and stable positioning of the electric components in the mold, which reliably prevents the ingress of moisture and, in addition, permits simple and low-cost manufacture.

According to the present invention, at least one positioning element is provided which is formed integrally with the first housing part and used to fix the first housing part in position in the mold during the manufacture of the second housing part. Displacement of the electric components is thereby avoided. To reliably prevent the ingress of moisture between preferably a plurality of positioning elements and the second housing part, the second housing part is molecularly interfaced with the positioning elements during the injection-molding process of the second housing part.

The molecular bond is facilitated by at least one melting element, preferably a plurality of melting elements though, which are integrated with the positioning elements. To prevent the ingress of moisture at different locations in the first housing part, for example, at the bottom end where the pole shoes enter in a passive sensor, the melting ribs may also be designed directly on the first housing part.

In a preferred aspect of the present invention, the melting process is particularly simple when the melting elements are configured as thin ribs which are partly liquefied when injection-molding the second housing part.

It is appropriate that the melting elements are made of a thermoplastic material which has a melting point that is lower than, or at most equal to, the melting point of the material of the second housing part. At a too low melting temperature of the ribs, the ribs would be completely molten and unable to establish a molecular bond with the second housing part. If the melting temperature of the ribs was much higher, compared to that of the second housing part, the ribs would not melt on the surface.

Especially as far as active sensors are concerned, the small overall size of these sensors, compared to passive sensors, frequently does not permit the accommodation of all electric components in a first housing part. Therefore, it is especially favorable in the injection-molding process for making the second housing part that the components can be fixed in position in the mold by preferably a plurality of additional positioning elements. The additional positioning elements, in turn, establish a molecular bond with the second housing part. This occurs particularly by way of the mentioned melting ribs provided on these elements.

According to one embodiment of the present invention, at least one portion of a positioning element is configured as a bore. The bore is favorably used to accommodate pins or pin-like elements by which the first housing part can be fixed in position in a mold. The advantage is that the positioning elements are not required to include portions which project from the sensor housing in order to fix the first housing part. Advantageously, this eliminates the need of removing these portions in the manufacture of the sensor of the present invention.

It is preferred that the positioning elements extend in a radial direction from the center line of the sensor outwardly in the direction of the mold. Twisting or dislocating of the first housing part with the electric components accommodated therein is reliably prevented by a direct form-locking connection of the positioning elements with the mold.

The melting ribs are arranged especially radially circumferentially about the axis of the positioning elements in order to shut off any possible leakage gap between the positioning elements and the second housing part.

However, the melting elements may also be arranged on any other end of the first housing part where individual electric components project from the first housing part. In turn, possibly existing leakage gaps are shut off by way of the melting ribs which are radially circumferential with respect to the center line of the sensor.

To directly fix the first housing part in position in the mold, it is preferred that the positioning elements project at least slightly from the outside contour of the sensor. The projecting portions can be embedded in the mold in a simple fashion.

In this arrangement, the positioning elements are favorably so configured that they can easily be separated, for example, cut off, after injection-molding the second housing part.

The electrically conductive connection between the contacts of the electric components and the cable conductors which extend out of the sensor can be provided, according to the present connection, by way of a molecular bond, such as soldering or welding, and by way of a form-locking, especially a mechanical, connection. Favorable combinations of these two types of connection are also possible. In particular, the electrically conductive connection of the components is effected by crimped connections according to the present invention. Thus, possibly occurring tensile forces in cables are taken up by the crimped sleeves rather than by the contacts. The crimped connections can be positioned in the first and the second housing parts.

The crimped connection can be anchored in the first housing part. In this variation of the present invention which is called 'pre-mold I', the forces which act upon the cable conductor during molding the second housing part can be absorbed by the crimped sleeves and, thus, by the first housing part.

However, it is also possible in a variation of the present invention called 'pre-mold II' that the crimped connections are located in the second housing part. The crimped connection may then be made more easily after injection-molding the first housing part because the electronic components are adapted to be handled together with the first housing part.

In still another aspect of the present invention, the electric components have at least in part radially outwardly projecting portions. By way of these preferably lug-shaped portions of a mounting plate of the components, the electric components and, more particularly, the mounting plate of a sensor element configured as a chip can be fixed in position in the first housing part and/or the mold in the injection-molding operation. Especially when fixing the electric components in the first housing part, it is especially preferred that the first housing part has groove-type openings into which the projecting portions can be inserted. This reliably prevents the components from dislocating during injection-molding the second housing part and permits precisely positioning the electric components in the first housing part. This permits exactly determining especially the position of the reading point of the sensor element in the sensor.

The method of the present invention used to manufacture sensors of this type is especially simple and inexpensive.

Initially, the respective electric components are injection-molded with the first housing part or fixed therein by embedding or inserting. Subsequently, the first housing part including the electric components incorporated therein is fixed in position in a mold by way of the positioning elements. The second housing part is then injection-molded around the first housing part.

The materials of the positioning elements and the second housing part are preferably similar, and have at least roughly the same melting point, thereby establishing a molecular bond between these parts during injection-molding the second housing part.

In particular in active sensors which have a very small overall size, electric components which are disposed outside the first housing part can also be fixed in position in the mold by additional positioning elements in the second process step. This prevents dislocation of these components during the subsequent injection-molding process.

In a process step following the main process, portions of the positioning elements which possibly project from the outside contour of the sensor can be severed. This permits most different shapes of the positioning elements at various locations of the first housing part which do not impair the size and final shape of the respective sensor though.

The contacts of the electric components are connected in an electrically conductive manner to the cable conductors in one single step by crimped sleeves, preferably before injection-molding the second housing part. The crimped sleeves take up cable tensile forces what obviates the need for a nozzle.

In one embodiment, the crimped connection is already established before the first housing part is injection-molded. This way the crimped connection can be arranged in the first housing part, with the result that forces which act upon the cable conductors during injection-molding of the second housing part are taken up by the first housing part by way of the crimped connection.

Alternatively, the crimped connection can also be produced only after injection-molding the first housing part. It is then easier to make the crimped connection because the electronic components are easier to handle along with the first housing part.

As has been explained hereinabove, at least parts of the electric components are positioned in the first housing part and/or the mold preferably by way of portions which radially project from them. Positioning the components can be effected by injection-molding the electronic components with the first housing part or by inserting the projecting portions or lugs in grooves of the first housing part. This effectively prevents the components from dislocating during the injection-molding process and exactly predetermines the position of the components in the first housing part and, thus, in the sensor.

BRIEF DESCRIPTION OF THE DRAWINGS

FIG. 5b is a cross-sectional lateral view of an embodiment which is an alternative of FIG. 5a.

DETAILED DESCRIPTION OF THE PREFERRED EMBODIMENTS

Figure 1:
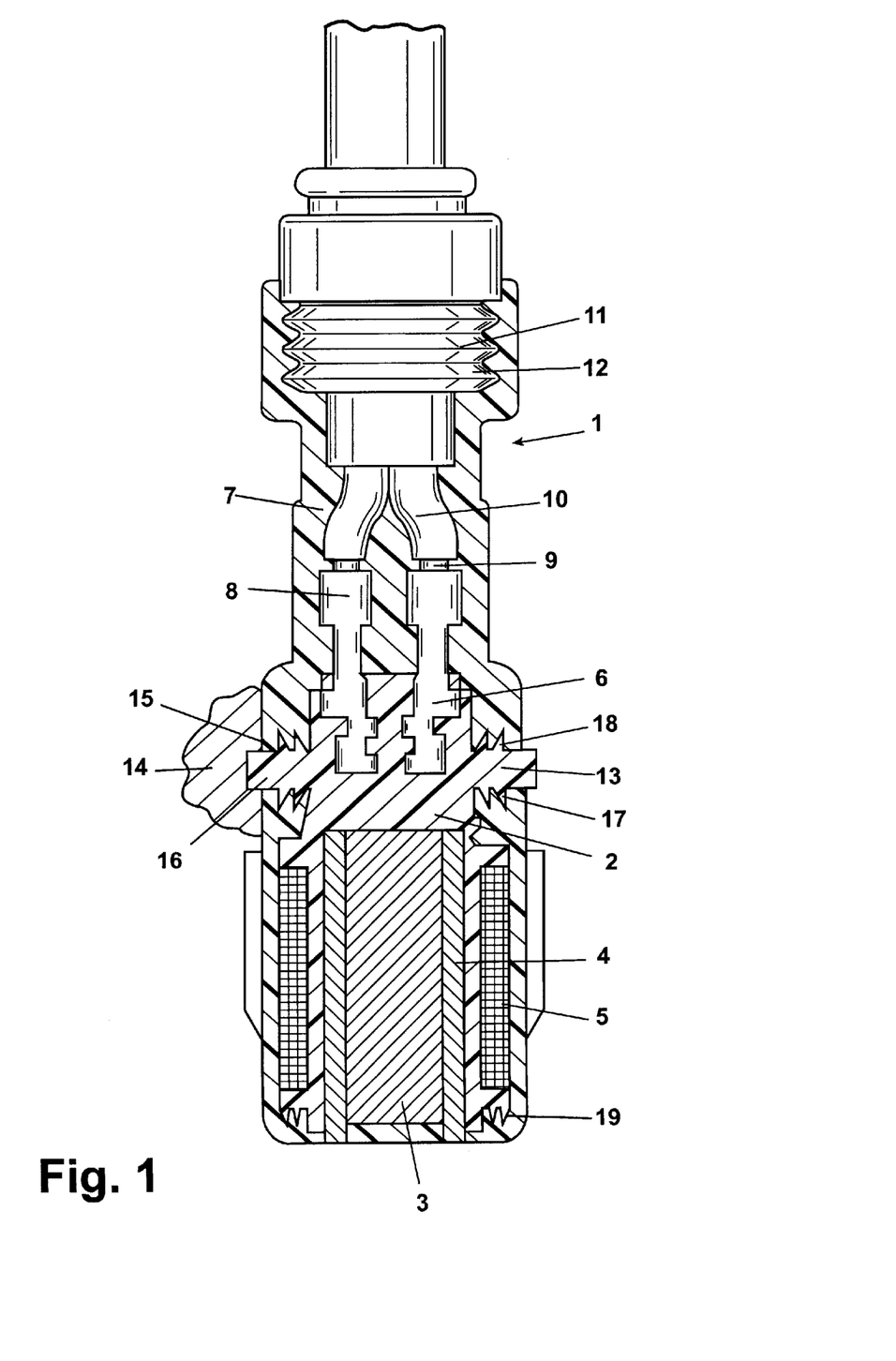
FIG. 1 is a partial cross-sectional view of a passive sensor made of plastics according to the present invention.

FIG. 1 represents a partial cross-sectional view of a passive sensor 1 according to the present invention which is of the induction principle type. Sensor 1 generally comprises a first housing part or coil member 2 made of plastic which accommodates as electric components a permanent magnet 3, two pole shoes 4, a coil 5 and its contacts 6, and a second injection-molded housing part 7 which is also made of plastic. The contacts 6 are connected by crimped connections 8 to electric conductors 9 which have an insulation 10 and, in their further course, extend out of the sensor 1 through a nozzle 11 around which the second housing part 7 is injection-molded. Nozzle 11 which includes ribs 12 that are positively engaged with the second housing part 7 is used to seal and position the cable 9, 10 in the second housing part 7.

It is preferred that the first housing part 2 includes two integrally designed positioning elements or pegs 13 according to the present invention. The positioning elements 13 in this embodiment extend in a radial direction in relation to the center line of sensor 1 from the first housing part 2 outwardly. When injection-molding the second housing part 7, the positioning elements are used to position the first housing part 2 and the incorporated electric components 3–6 in the mold 14. To this end, the positioning elements 13 project at least slightly from the outside contour 15 of sensor 1. The projecting portions 16 of the positioning elements 13 are placed in corresponding recesses of the mold 14 in positive or operative engagement therewith.

In an alternative embodiment of the present invention (not shown), it is also possible that the positioning elements are configured, at least in part, as a bore in the first housing part 2. The first housing part 2 is then fixed in the mold 14 by way of pins or pin-shaped elements (not shown) which can be inserted into the bore. In this case, there is no need for the positioning elements 13 to have a radially projecting design. Favorably, this obviates the need to sever them, where such separation is required.

To avoid the ingress of moisture between the positioning elements 13 and the second housing part 7, according to the present invention, the positioning elements 13 include at least one, preferably a plurality of melting elements 17 which establish a molecular bond with the second housing part 7 during said's manufacture. Preferably, the melting elements 17 are configured as thin melting ribs 18 which extend circumferentially around the center line of the positioning elements 13. When the second housing part 7 is injection-molded, the ribs 18 partly commence melting on their surface due to the occurring contact temperature and a melting pressure of up to 400 bar and thus constitute a molecularly interfaced and fluid-tight connection with the second housing part 7. A thermoplastic is preferred as a material for the first housing part 2 and also the melting ribs 18 because it has a melting temperature which is lower or, respectively, not higher than that of the second housing part 7.

It is also possible by means of the positioning elements 13 that the pole shoes 4 (which have a different look in this design) are totally encompassed by the second housing part 7 so that again moisture cannot enter the sensor 1, not even at this location. In the embodiment shown, the ingress of water is prevented at the bottom end of the first housing part 2 by further melting ribs 19 which are arranged radially circumferentially in relation to the center line of the sensor 1 and, exactly as the above-mentioned ribs 18, enter into a molecular bond with the second housing part 7.

Figures 2, 3, 4:
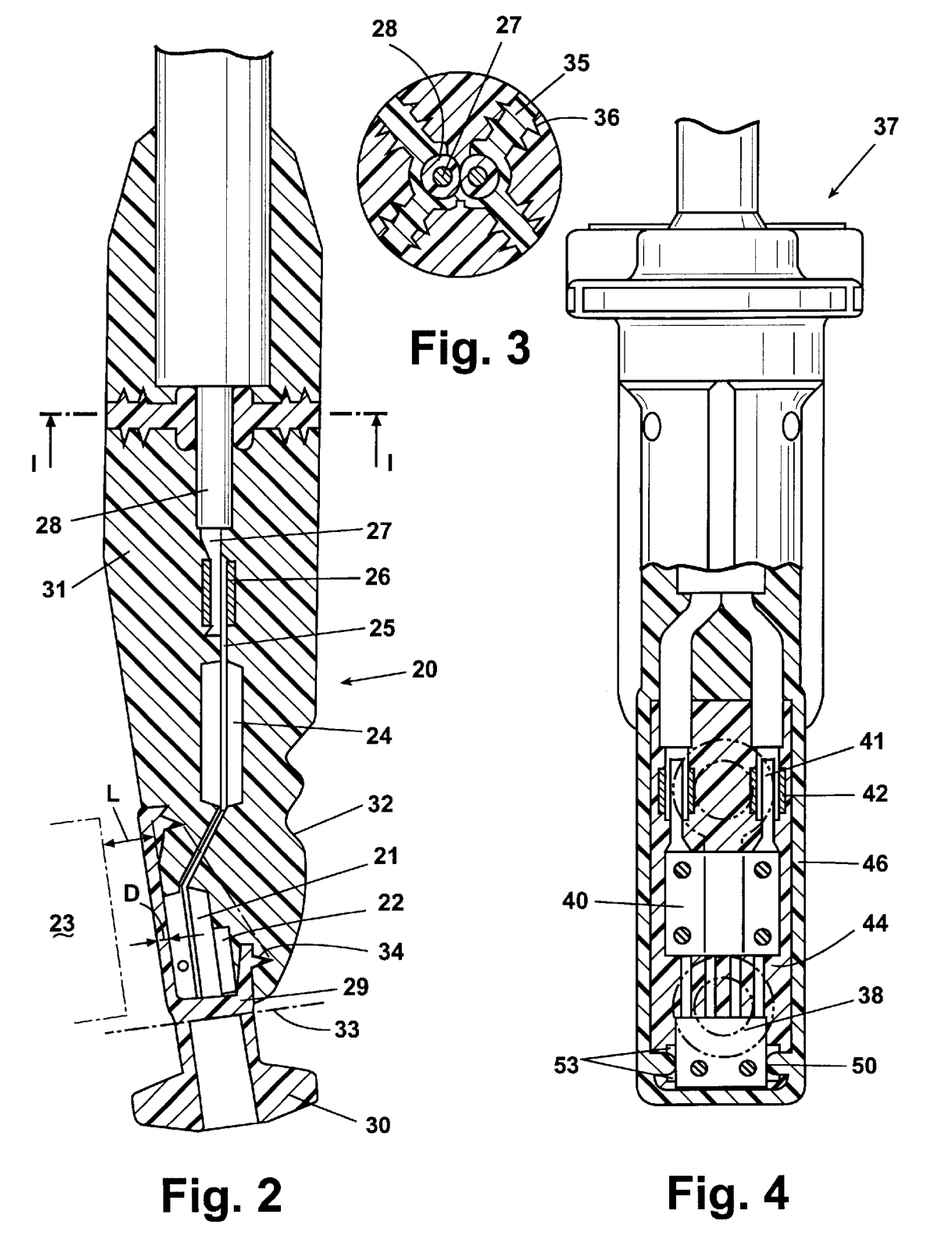
FIG. 2 is a partial cross-sectional view of a first embodiment of an active sensor made of plastics.
FIG. 3 is a cross-section taken along line I—I of the FIG. 2 embodiment.
FIG. 4 is a partial cross-sectional view of a second embodiment of an active sensor according to the present invention.

An active sensor 20 according to the present invention is shown in a partially cross-sectional view in the embodiment of FIG. 2. The need for the coil in the sensor is eliminated in sensors of this type so that active sensors may have an essentially smaller overall size compared to passive sensors. It is preferred that the active sensor 20 comprises a combination of a magnetostatically or magnetoresistively sensitive element 21 and a biasing magnet 22 which is magnetically coupled to an encoder 23 (shown only schematically). The signal voltage produced by the sensor element 21, which may be a Hall probe or, as in this case, a magnetoresistive resistance bridge, is evaluated by a circuit which is preferably realized by an integrated circuit and accommodated in an IC housing 24. Contacts 25 of the IC 24 are preferably connected by crimped contacts 26 to electric conductors 27 which are encompassed by an insulation 28 each and extend out of the sensor 20. As an alternative of crimped connections, molecular bonds, such as soldering or welding, are possible to produce the electric connection between the conductors 27 and the contacts 26. Also possible is a combination of a crimped connection and such a molecular bond.

The sensor element 21 and the biasing magnet 22 are embedded in a first housing part 29 which is additionally used as a positioning element. The positioning element 29 includes at its bottom end a positioning portion 30 by which the first housing part 29 is non-rotatably and unslidably fixed in position in a mold (not shown) during the injection-molding process of a second housing part 31. The portion 30, which projects from outside contour 32 of the sensor 20 is severed, for example cut, along line 33 after completion of the sensor 30. This provides the sensor 20 with very small overall dimensions.

Similar to the conditions hereinabove, the positioning element 29 has elements configured as melting ribs 34 which constitute a molecular bond with the second housing part 31 and thereby prevent the ingress of moisture between the first and the second housing part 29, 31, as has been described hereinabove.

Due to the special shape of the first housing part 29, its wall thickness D may be configured especially small. According to the present invention, the utilizable air slot L between the sensor element 21 and the encoder 23 can be very large this way. This advantage is particularly significant because it minimizes the mounting space of the sensor, for example, in the wheel bearing of an automobile.

FIG. 3 shows a cross-section of FIG. 2 taken along the line of intersection I—I. The electric conductors 27 which are disposed outside the first housing part 29, by way of their insulation 28, are fixed in the mold by additional positioning elements 35 when the second housing part 31 is injection-molded. This is especially advantageous in active sensors which have a small overall size so that not all the electric components can be accommodated in the first housing part 29. These parts may be fixed in the mold by way of additional positioning elements. The positioning elements 35 in turn include melting elements 36 whose mode of operation and purpose have already been referred to hereinabove.

Figure 5A:
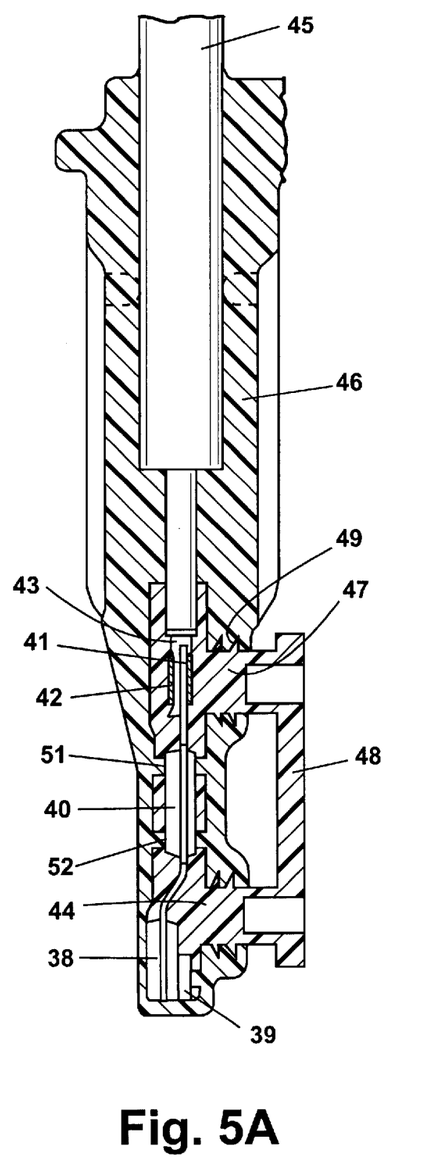
FIG. 5a is a cross-sectional lateral view of the embodiment shown in FIG. 4.
Figure 5B:
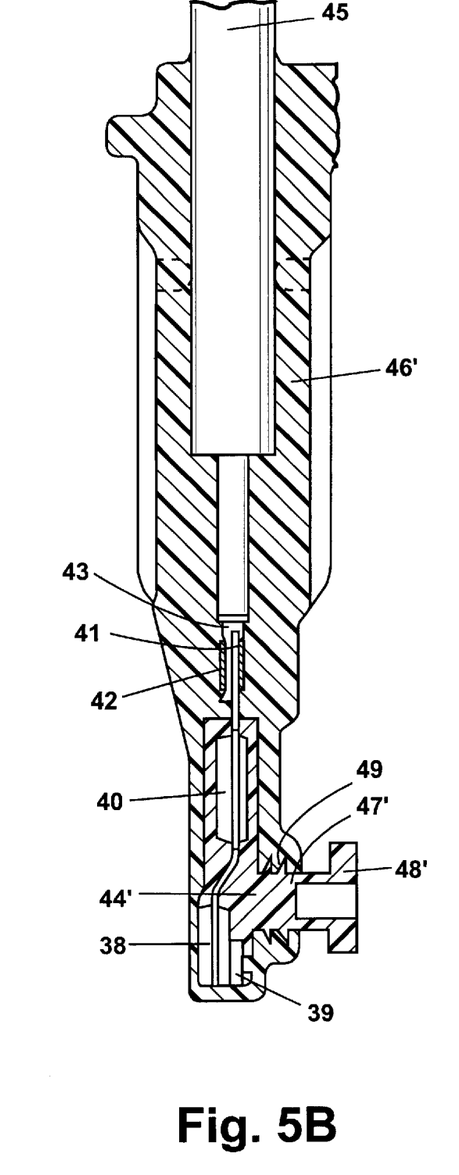

Another active sensor 37 of the present invention is shown in a top and a lateral view, partly in cross-section, in FIGS. 4, 5a and 5b. The design of the electric components and their mode of operation with respect to the sensor element 38, the biasing magnet 39, and the IC housing 40 has already been described with respect to FIG. 2 and will not be repeated.

Again, contacts 41 of the IC 40 are preferably connected to electric conductors 43 by way of crimped sleeves 42. The crimped connection of these parts is advantageously provided in one single operation. However, similar to the embodiments of FIG. 2, other types of connection such as soldering or welding and combinations of such connections with crimping are also possible. In the embodiment of FIG. 5a (Pre-mold I), the crimped connection is arranged in a first housing part 44 so that tensile forces, which may act on cable 45, will not be taken up by the contacts 41 but by the first housing part 44 by way of the crimped sleeves 42. In comparison to the embodiment shown in FIG. 2, another improvement is thereby achieved because this way the first housing part 44 can also take up the forces which act upon the cable 45 when a second housing part 46 is injection-molded. As an alternative, the crimped connection according to FIG. 5b may also be arranged in the second housing part 46' (Pre-mold II). The crimped connection may then be made more easily after injection-molding of the first housing part 44' because the electronic components 38–43 can be handled together with the first housing part 44'.

When the second housing part 46, 46' is injection-molded, the first housing part 44, 44' is fixed in a mold (not shown) again by way of positioning elements 47, 47', and the projecting portions 48, 48' of the positioning elements 47, 47' are severed after completion of the sensor 37. Sealing of the first and second housing parts 44, 44' and 46, 46' is again provided by way of melting ribs 49 which are molecularly interfaced with the second housing part 46, 46' and integrally connected to the first housing part 44, 44'.

Another advantage is achieved in this active sensor 37. When the electric components 38, 39, 40 are injection-molded with the first housing part 44, 44', they can be supported in the mold for exact positioning. The remaining supporting points or openings 50, 51, 52 are potential tracks for the entry of moisture. To prevent this occurrence, the openings are closed simultaneously when the second housing part 46, 46' is injection-molded according to the present invention.

According to an especially preferred embodiment of the present invention, at least the carrier plate of a sensor element 38, which is particularly configured as a chip, includes radially projecting portions 53 which are preferably shaped as lugs. Such a supporting element 53, which is also termed as lead frame support, permits fixing the component 38 in position in the first housing part 44, 44' and/or the mold (not shown) during the injection-molding operation of the second housing part 46, 46'. This reliably prevents a position shift of the sensor element 38 during the injection-molding operation, and permits an exact positioning of the electric component 38 in the first housing part 44. More particularly, this permits exactly determining the position of the reading point of the sensor element 38 in the sensor 37.

Figure 6:
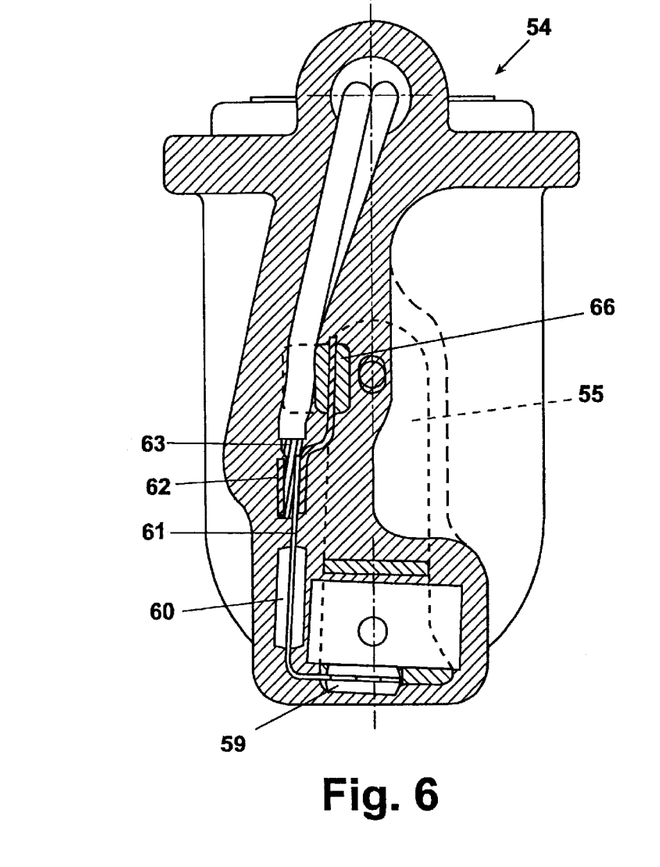
FIG. 6 is a cross-sectional lateral view of a second embodiment of an active sensor of the present invention.
Figure 7:
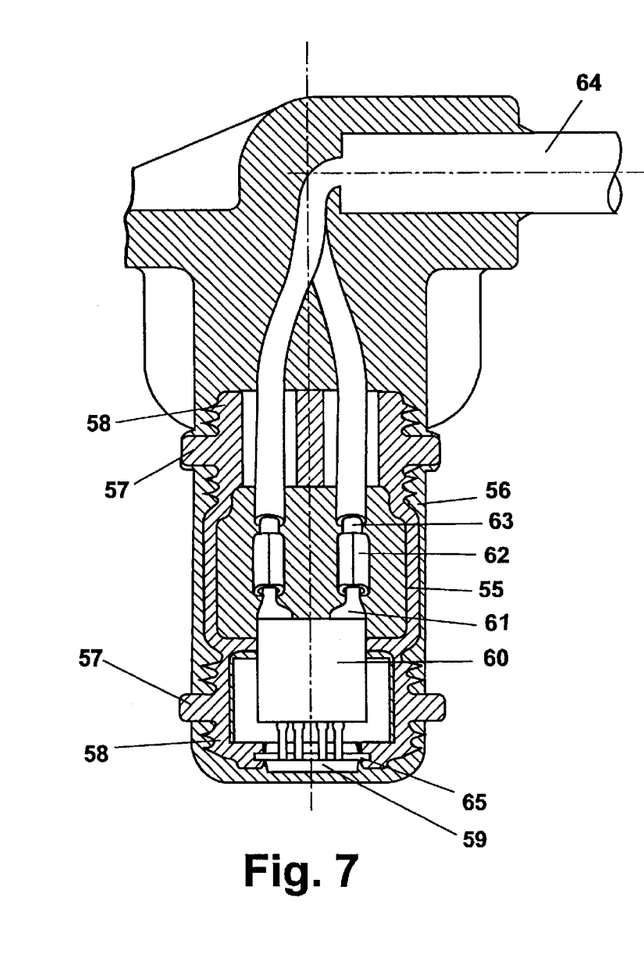
FIG. 7 is a cross-sectional view of the embodiment shown in FIG. 6.

FIGS. 6 and 7 show another embodiment of an active sensor 54 of the present invention. Sensor 54 again has a first and a second housing part 55, 56. Connected integrally with the first housing part 55 are positioning elements 57 which are sealed in relation to the atmosphere preferably by melting ribs 58. Further, the first housing part 55 houses electric components such as a sensor element 59 and an IC housing 60. Housing 60 includes contacts 61 which are electrically conductively connected to conductors 63 by way of crimped sleeves 62. As mentioned hereinabove, this connection may be a molecular bond or a combination of a molecular bond and a crimped connection. The conductors 63 have an insulation and extend out of the sensor 54 by way of a cable 64.

As has already been explained in connection with FIGS. 4, 5a, and 5b, the sensor element 59 has radially projecting portions 65 which are used as a support to fix the sensor element 59 in position and, thus, serve to determine an exact reading point in the sensor 54. In particular, the portions 65 can be inserted or slipped into associated groove-shaped openings of the first housing part 55 so that injection-molding of the electric components 59–63 is not required in this case and can be replaced by the insertion.

The crimped contacts 62 are connected with a retaining element 66 in this embodiment. The retaining element 66 is anchored in the first housing part 55 when said is injection-molded and is thereby favorably permitted to accommodate tensile forces which act upon the crimped connection, and direct them to the first housing part 55.

What is claimed is:

1. Sensor for sensing position shifts, motional velocities or rotational speeds of an encoder, comprising:
  a housing accommodating electric components, said housing including a first housing part made of plastic, which is enwrapped at least in part by a second housing part which is also made of plastic in an injection-molding operation, wherein the first housing part includes a first at least one positioning element which is connected with the second housing part and wherein the first at least one positioning element includes at least one integral melting element.

2. Sensor as claimed in claim 1, wherein the first housing part includes at least one integral melting element.

3. Sensor as claimed in claim 2, wherein the at least one melting element is configured as a thin rib.

4. Sensor as claimed in claim 2, wherein the at least one melting element is made of thermoplastic material which has a melting point lower than, or at most equal to, that of the material of the second housing part.

5. Sensor as claimed in 1, wherein electric components arranged outside the first housing part are provided with at least one additional positioning element which is molecularly interfaced with the second housing part.

6. Sensor as claimed in claim 1, wherein at least one portion of the first at least one positioning element is configured as a bore in the first housing part.

7. Sensor as claimed in claim 6, wherein the bore is capable of accommodating a pin or pin-shaped element.

8. Sensor as claimed in claim 1, wherein the first at least one positioning element extend radially outwardly in relation to a center line of the sensor.

9. Sensor as claimed in claim 8, wherein the at least one melting element is arranged on the circumference of the first at least one positioning element.

10. Sensor as claimed in claim 1, wherein the at least one melting element is arranged circumferentially about the center line of the sensor on at least one end of the first housing part.

11. Sensor as claimed in claim 1, wherein the first at least one positioning element projects from the outside contour of the sensor.

12. Sensor as claimed in claim 11, wherein the portions of the first at least one positioning element which projects from the outside contour of the sensor is easily removable.

13. Sensor as claimed in claim 1, wherein a electrically conductive connection between the electric components and the electric conductors is by a molecular bond.

14. Sensor as claimed in claim 13, wherein the electrically conductive connection is a combination of a molecular bond and an operative connection.

15. Sensor as claimed in claim 1, wherein an electrically conductive connection between the electric components and the electric conductors is by crimped connections.

16. Sensor as claimed in claim 15, wherein the crimped connections are arranged in the first housing part.

17. Sensor as claimed in claim 15, wherein the crimped connections are arranged in the second housing part.

18. Sensor as claimed in claim 1, wherein the electric components have at least in part radially outwardly projecting portions.

19. Sensor as claimed in claim 18, wherein at least the first housing part includes openings to accommodate the outwardly projecting portions of the electric components.

20. Method of manufacturing a sensor for sensing position shifts, motional velocities or rotational speeds of an encoder, which includes a housing accommodating electric components and comprising a first housing part and a second housing part made of plastic, comprising the steps of:
    a) injection-molding or inserting at least one part of the electric components into a first housing part,
    b) fixing the first housing part in a mold by means of at least one positioning element which is integrally connected to the first housing part, wherein the at least one positioning element includes at least one integral melting element, and
    c) injection-molding the second housing part around the first housing part.

21. Method as claimed in claim 20, wherein in that electric components which are arranged outside the first housing part are fixed in position in the mold by at least one additional positioning element before the second housing part is injection-molded.

22. Method as claimed in claim 20, wherein the at least one positioning element and the second housing part are molecularly bonded.

23. Method as claimed in claim 20, wherein the first housing part is fixed in position in the mold by at least one pin which is fixed in a bore of a positioning element.

24. Method as claimed in claim 20, wherein portions of the at least one positioning element which project from the outside contour of the sensor are severed after the second housing part has been injection-molded.

25. Method as claimed in claim 20, wherein the electric components and the electric conductors are connected so as to be electrically conductive by way of a molecular bond.

26. Method as claimed in claim 25, wherein the electrically conductive connection is provided by a combination of a molecular bond and an operative connection.

27. Method as claimed in claim 25, wherein the electrically conductive connection is established before the first housing part is injection-molded around the electric components.

28. Method as claimed claim 25, wherein the electrically conductive connection is established after the first housing part is injection-molded around the electric components.

29. Method as claimed in claim 20, wherein the electric components and the electric conductors are connected so as to be electrically conductive by way of crimped connections.

30. Method as claimed in claim 20, wherein the electric components are at least in part fixed in position in the first housing part or the mold by way of radially projecting portions before the second housing part is injection-molded.

31. Method as claimed in claim 20, wherein the electric components are at least in part fixed in position in openings of the first housing part by way of radially projecting portions before the second housing part is injection-molded.

* * * * *